United States Patent
Yoon et al.

(10) Patent No.: US 10,411,233 B2
(45) Date of Patent: Sep. 10, 2019

(54) SECONDARY BATTERY CARTRIDGE AND BATTERY MODULE COMPRISING SAME

(71) Applicant: LG CHEM, LTD., Seoul (KR)

(72) Inventors: Doo-Han Yoon, Daejeon (KR); Sung-Jong Kim, Daejeon (KR); Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 109 days.

(21) Appl. No.: 15/559,710

(22) PCT Filed: Aug. 30, 2016

(86) PCT No.: PCT/KR2016/009667
§ 371 (c)(1),
(2) Date: Sep. 19, 2017

(87) PCT Pub. No.: WO2017/069397
PCT Pub. Date: Apr. 27, 2017

(65) Prior Publication Data
US 2018/0254444 A1    Sep. 6, 2018

(30) Foreign Application Priority Data

Oct. 23, 2015 (KR) ........................ 10-2015-0148075

(51) Int. Cl.
*H01M 10/052* (2010.01)
*H01M 2/12* (2006.01)
(Continued)

(52) U.S. Cl.
CPC ......... *H01M 2/1252* (2013.01); *H01M 2/043* (2013.01); *H01M 2/1077* (2013.01);
(Continued)

(58) Field of Classification Search
CPC .................. H01M 10/052; H01M 10/0525
See application file for complete search history.

(56) References Cited

U.S. PATENT DOCUMENTS

2007/0122692 A1* 5/2007 Smith ................ H01M 2/0202
429/87
2009/0274952 A1* 11/2009 Wood ..................... B60L 50/64
429/99
(Continued)

FOREIGN PATENT DOCUMENTS

EP    1 744 383 A1    1/2007
JP    2005-322434 A    11/2005
(Continued)

OTHER PUBLICATIONS

International Search Report issued in PCT/KR2016/009667 (PCT/ISA/210), dated Dec. 27, 2016.

*Primary Examiner* — Olatunji A Godo
(74) *Attorney, Agent, or Firm* — Birch, Stewart, Kolasch & Birch, LLP

(57) ABSTRACT

A secondary battery cartridge includes: a battery storing box including a battery accommodation space in which a secondary battery is stored, and a flow channel partitioned from the battery accommodation space and having a hollow structure, and including, at opposite side parts thereof, respectively, a slot communicating with the battery accommodation space, and a venting hole communicating with the flow channel; a sensing unit including an electrically conductive material, mounted on at least one side part of the battery storing box, and electrically connected to an electrode lead of the secondary battery, the electrode lead extending to an inside and an outside of the battery storing box through the slot; and a cover unit provided in a box form having one open side, and mounted on the opposite side parts of the battery storing box in order to shield the slot, the venting hole, and the sensing unit of the battery storing box, wherein a gas outlet is provided to the cover unit mounted on at least one of the opposite side parts of the battery storing box.

16 Claims, 9 Drawing Sheets

(51) Int. Cl.
  *H01M 2/04*   (2006.01)
  *H01M 2/10*   (2006.01)
  *H01M 10/48*  (2006.01)

(52) U.S. Cl.
  CPC ....... *H01M 2/1094* (2013.01); *H01M 10/482* (2013.01); *H01M 2220/20* (2013.01)

(56) References Cited

U.S. PATENT DOCUMENTS

| | | |
|---|---|---|
| 2009/0325042 A1 | 12/2009 | Koetting et al. |
| 2012/0276430 A1 | 11/2012 | Witting |
| 2013/0183544 A1 | 7/2013 | Yoshioka et al. |
| 2015/0099146 A1 | 4/2015 | Kim et al. |
| 2015/0214569 A1 | 7/2015 | Kim et al. |
| 2017/0033419 A1 | 2/2017 | Eom et al. |

FOREIGN PATENT DOCUMENTS

| | | |
|---|---|---|
| JP | 2010-165686 A | 7/2010 |
| JP | 2013-73754 A | 4/2013 |
| JP | 2013-168355 A | 8/2013 |
| KR | 10-2013-0126159 A | 11/2013 |
| KR | 10-2014-0024579 A | 3/2014 |
| KR | 10-2015-0118375 A | 10/2015 |

\* cited by examiner

SECONDARY BATTERY CARTRIDGE AND BATTERY MODULE COMPRISING SAME

TECHNICAL FIELD

The present disclosure relates to a secondary battery cartridge, and more particularly, a secondary battery cartridge having a flow channel for gas ventilation inside the cartridge, and a battery module including the secondary battery cartridge.

The present application claims priority to Korean Patent Application No. 10-2015-0148075 filed on Oct. 23, 2015 in the Republic of Korea, the disclosure of which is incorporated herein by reference.

BACKGROUND ART

Recently, secondary batteries are widely used for electric automobiles which secure driving force by using an internal combustion engine and/or an electric motor, as well as miniaturized apparatuses such as portable electronic apparatuses. The electric automobiles include hybrid automobiles, plug-in hybrid automobiles, and pure electric automobiles which are driven by only an electric motor and a battery without an internal combustion engine.

In the case where a secondary battery is used for the electric automobile, lots of secondary batteries are electrically connected in order to increase capacity and power. Particularly, a pouch type secondary battery is widely used for medium and large apparatuses due to an advantage in easy stacking.

The mechanical rigidity of the pouch type secondary battery is not high because the pouch type secondary battery is generally packed with a battery case of a laminated sheet including aluminum and a polymer resin. Therefore, when a battery module including a plurality of pouch type secondary batteries is configured, a cartridge is generally used in order to protect the secondary battery from external impact, etc., prevent moving of the secondary battery, and facilitate stacking.

A plurality of cartridges each storing a pouch type secondary battery are provided such that the cartridges are mutually stacked, and the battery module may include the plurality of stacked secondary batteries and cartridges.

A pouch type secondary battery performs charging or discharging through an electrochemical reaction. When heat generated during the charging/discharging process is not effectively dissipated, temperature inside the secondary battery may rise rapidly. The rapid rise in the temperature causes a decomposition reaction of an electrolyte and thus generates gases inside the secondary battery.

In this case, a swelling phenomenon, which is a kind of an inflating phenomenon, may occur due to an increase in internal pressure of the battery case, and furthermore, when the swelling phenomenon becomes severe, a serious problem such as an explosion of the secondary battery may occur.

Therefore, the pouch type secondary battery is generally designed such that when internal pressure of the battery case reaches a preset pressure or more, sealing of the battery case is released and gases are discharged to outside.

Meanwhile, a battery pack of an electric automobile is configured such that gases are not introduced into a compartment even when the gases are generated from the secondary battery. For example, as illustrated in FIG. 1, a battery module 2 including a plurality of secondary batteries and cartridges according to the related art may be sealed by an external pack case 1. Therefore, in the case where gases are generated from the battery module 2, the gases are locked in the external pack case 1. Also, when internal pressure of the pack case 1 rises, a gas outlet 3 provided to one side of the pack case 1 is open and may discharge the gases to the outside of the pack case 1. In this case, since the gas outlet 3 is connected to an exhaust line of an automobile, the gases may be safely discharged to the outside of the automobile along the exhaust line.

However, since a battery pack used for medium and large apparatuses such as electric automobiles includes intensively configured battery modules in order to provide high power, a volume and weight thereof increase more and more. The size of the battery pack increases more and more, but a space inside an electric automobile in which the battery pack may be installed is limited.

Therefore, to efficiently install a high-capacity battery pack in a limited space inside an electric automobile, a structure change of a battery pack itself is required, and change of components forming the battery pack meeting this requirement is also required.

DISCLOSURE

Technical Problem

The present disclosure is designed to solve the problems of the related art, and therefore the present disclosure is directed to providing a secondary battery cartridge configured to store a secondary battery and guide gases generated from the secondary battery to a specific direction in case of emergency.

The present disclosure is directed to reducing the volume of a battery pack and thus reducing a space limitation by configuring a battery module or a battery pack using the secondary battery cartridges without a battery pack case.

However, technical objects of the present disclosure are not limited to the above objects, and these and other objects and advantages of the present disclosure may be understood from the following detailed description and will become more fully apparent from the exemplary embodiments of the present disclosure.

Technical Solution

In one aspect of the present disclosure, there is provided a secondary battery cartridge including: a battery storing box including a battery accommodation space in which a secondary battery is stored, and a flow channel partitioned from the battery accommodation space and having a hollow structure, and including, at opposite side parts thereof, respectively, a slot communicating with the battery accommodation space, and a venting hole communicating with the flow channel; a sensing unit including an electrically conductive material, mounted on at least one side part of the battery storing box, and electrically connected to an electrode lead of the secondary battery, the electrode lead extending to an inside and an outside of the battery storing box through the slot; and a cover unit provided in a box form having one open side, and mounted on the opposite side parts of the battery storing box in order to shield the slot, the venting hole, and the sensing unit of the battery storing box, wherein a gas outlet is provided to the cover unit mounted on at least one of the opposite side parts of the battery storing box.

The battery storing box may include an upper case and a lower case, and the battery accommodation space, the flow channel, the slot, and the venting hole may be formed by mutual coupling of the upper case and the lower case.

Each of the upper case and the lower case may include a battery storing unit configured to form a space in which the secondary battery is arranged; and a case peripheral unit configured to form a wall along a peripheral direction of the battery storing unit, the upper case and the lower case being coupled such that upper surfaces of the case peripheral units face each other.

The case peripheral unit may include a first groove collapsed by a preset depth from an upper surface thereof and configured to form the flow channel, the first groove extending to the venting hole.

The case peripheral unit may further include a second groove collapsed by a preset depth from an upper surface thereof at a location partitioned from the first groove, the battery storing box further including a sealing member provided to the second groove.

The case peripheral unit may further include a step difference unit lower than an upper surface thereof at locations corresponding to the opposite side parts, the step difference unit forming a part of the slot.

An assembly finger protruding further than other parts and including a through hole may be provided to a corner region of the case peripheral unit.

A rod-type fastening member may be inserted into and pass through the through hole of the assembly finger.

The sensing unit may include: a pair of brackets coupled to a lateral outer wall of the battery storing box such that the pair of brackets are spaced apart from each other at a preset interval with the slot therebetween; and a sensing block connected to the pair of brackets such that the sensing block is located in front of the slot, including a lead-passing hole through which an electrode lead of the secondary battery passes, and contacting the electrode lead.

The lead-passing hole may be provided as at least two lead-passing holes.

The secondary battery cartridge may further include a terminal passing through the cover unit and connected to the sensing block.

An O-ring is provided to a terminal through-hole of the cover unit through which the terminal passes.

The battery storing box may further include a third groove collapsed by a preset depth from opposite lateral outer walls of the battery storing box, connected to the second groove, and surrounding the slot and the venting hole, and the cover unit may include an inner cover having an open end corresponding to the third groove and configured to shield the slot and the venting hole, and an outer cover configured to shield the inner cover, the sealing member being further provided between the third groove and the open end of the inner cover.

In another aspect of the present disclosure, there is also provided a battery module including the secondary battery cartridge.

In still another aspect of the present disclosure, there is also provided a battery pack including the battery module.

In still another aspect of the present disclosure, there is also provided an automobile including the battery module.

Advantageous Effects

A secondary battery cartridge according to an aspect of the present disclosure has a structure in which when gases are generated from a secondary battery stored therein, the gases flow along a flow channel inside the secondary battery cartridge and are discharged to outside through a venting hole of the secondary battery cartridge.

Therefore, when a battery module is configured by using secondary battery cartridges according to the present disclosure, a related art pack case required for gas ventilation may be omitted. A battery module or a battery pack which omits the pack case may be less limited in space when installed in an electric automobile or a narrow space.

BEST MODE

Figure 1:
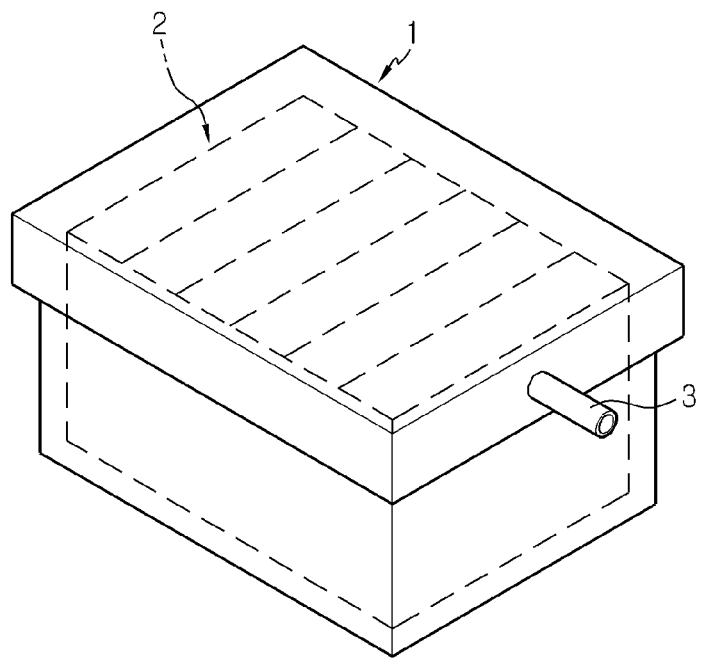
FIG. 1 is a perspective view schematically illustrating a configuration of a battery pack according to a related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Since embodiments of the present disclosure are provided to more completely explain the present disclosure to those skilled in the art, the shapes, the sizes, etc. of components in the drawings may be exaggerated, omitted, or schematically illustrated for more clear understanding. Therefore, the size or ratio of each component does not totally reflect an actual size or ratio.

Figure 2:
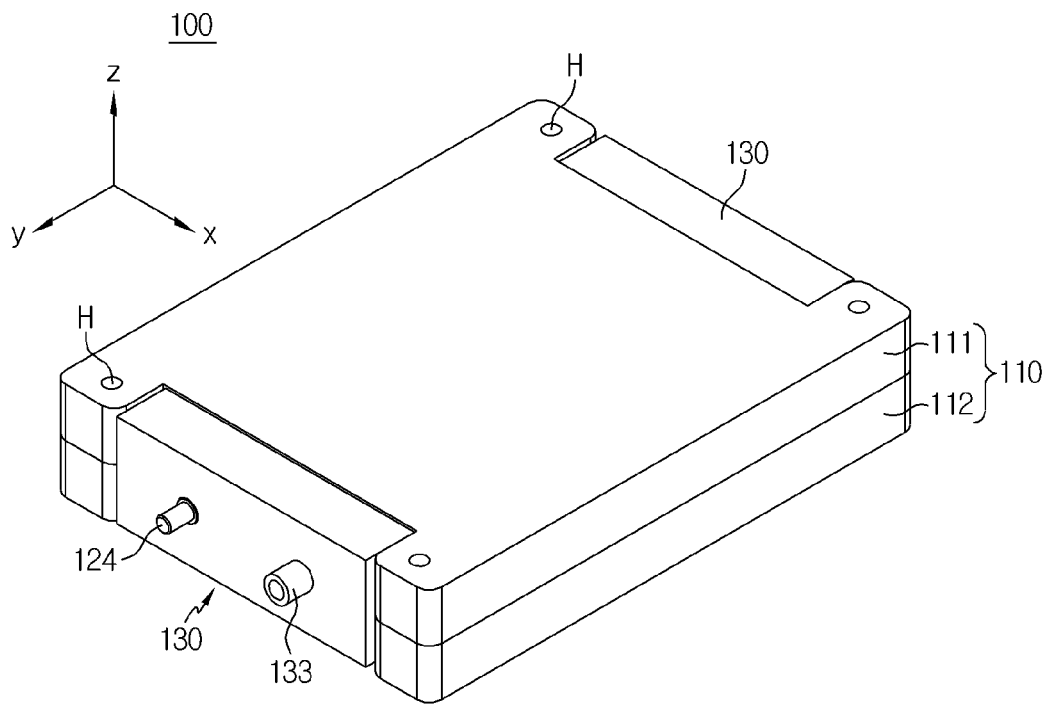
FIG. 2 is a perspective view illustrating a secondary battery cartridge according to an embodiment of the present disclosure.
Figure 3:
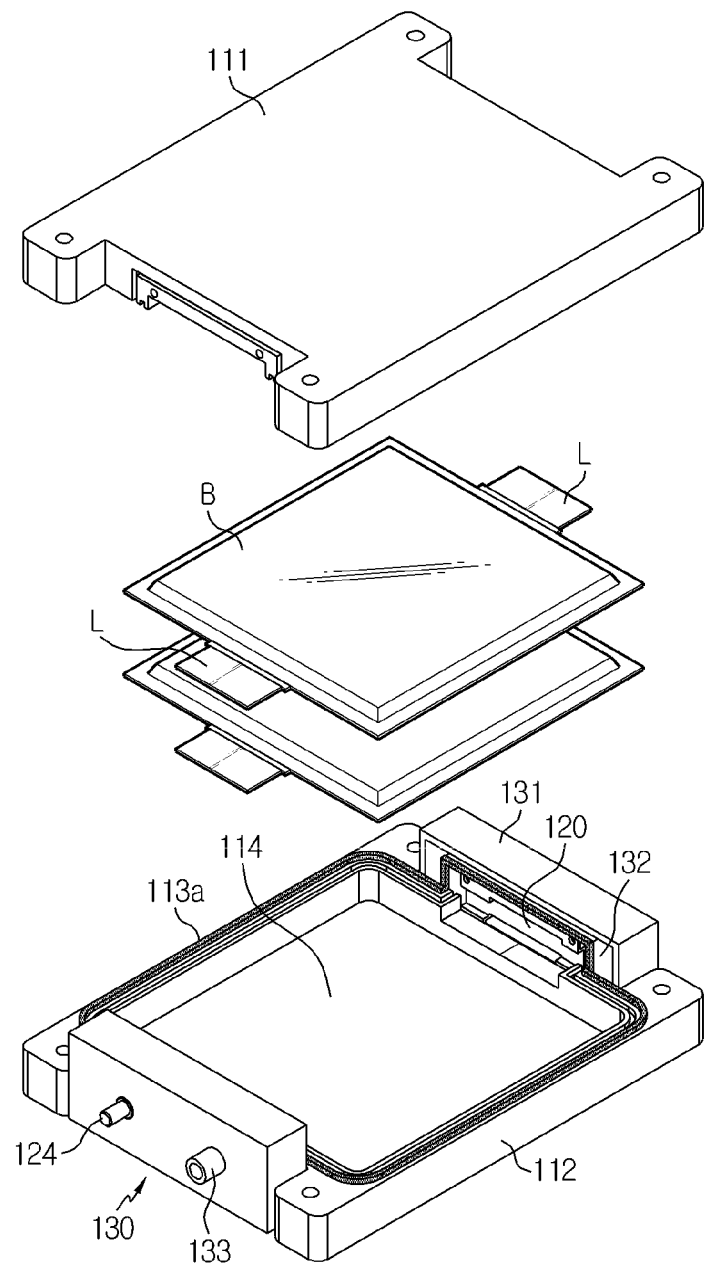
FIG. 3 is an exploded partial perspective view of FIG. 2.

FIG. 2 is a perspective view illustrating a secondary battery cartridge according to an embodiment of the present disclosure. FIG. 3 is an exploded partial perspective view of FIG. 2. FIGS. 4 to 7 are perspective views illustrating components of the secondary battery cartridge of FIG. 2.

Referring to the drawings, the secondary battery cartridge 100 according to the present disclosure includes a battery storing box 110, a sensing unit 120, and a cover unit 130.

As described below, in the present embodiment, since the cartridge 100 has a sealed structure except a gas outlet 133, a related art outer case entirely sealing assembled cartridges 100 is not required and thus the volume of a battery module 10 or a battery pack may be reduced, and also manufacturing costs may be reduced.

Each element configuring the secondary battery cartridge 100 is described. First, the battery storing box 110 is used for stacking a plurality of secondary batteries B, holds the secondary battery B to prevent movement thereof, is configured such that the secondary batteries B are mutually stacked, and thus guide assembly of the secondary batteries B.

Here, the plurality of secondary batteries B may be pouch type secondary batteries B. Each pouch type secondary battery may have an electrode lead L. The electrode lead L may include two electrode leads L (an anode lead and a cathode lead) protruding and extending in one direction or two directions. For example, two pouch type secondary batteries may be arranged in a layer form inside the battery storing box 110. An electrode lead L of one of the secondary batteries B may be fixed to an electrode lead L of the other of the secondary batteries B through welding. Through this configuration, the secondary batteries B may be electrically connected inside the battery storing box 110.

The battery storing box 110 may include an upper case 111 and a lower case 112. The upper case 111 and the lower case 112 may be provided such that they are coupled to and separated from each other. For example, as illustrated in FIGS. 2 and 3, the battery storing box 110 may be configured such that two pouch type secondary batteries B are stacked in the lower case 112 and then the lower case 112 is covered by the upper case 111. Also, the upper case 111 and the lower case 112 may be coupled as one body by a rod-type fastening member, for example, a long bolt 140, which may be inserted into a through hole H vertically passing through corners of the upper case 111 and the lower case 112. For reference, the upper case 111 and the lower case 112 may be coupled to each other by a hooking method.

Since the above-assembled battery storing box 110 has a structure in which all sides except opposite lateral sides (a Y axis direction in a rectangular coordinate system of FIG. 2 is defined as left and right lateral sides of the battery storing box 110) are closed, the stored secondary battery B may be sealed inside the battery storing box 110. However, an electrode lead L of the secondary battery B may be exposed to outside through a slot 116 (see FIG. 4) formed at the opposite lateral sides of the battery storing box 110. The electrode lead L of the secondary battery B may be electrically connected to the sensing unit 120.

Referring to FIGS. 4 to 7, the battery storing box 110 includes a battery accommodation space 114, a flow channel 115a, the slot 116, and a venting hole 117. Here, the battery accommodation space 114 and the flow channel 115a are provided together inside the battery storing box 110. The flow channel 115a is partitioned from the battery accommodation space 114 inside the battery storing box 110 and has a hallow structure. Also, the slot 116 and the venting hole 117 may be provided to the opposite lateral sides of the battery storing box 110. The slot 116 communicates with the battery accommodation space 114, and the venting hole 117 communicates with the flow channel 115a.

The battery accommodation space 114, the flow channel 115a, the slot 116, and the venting hole 117 may be formed by mutual coupling of the upper case 111 and the lower case 112.

For example, the upper case 111 and the lower case 112 have a structure in which the battery accommodation space 114, the flow channel 115a, the slot 116, and the venting hole 117 are symmetric with respect to a coupling surface. That is, the upper case 111 and the lower case 112 include a part of a shape of the battery accommodation space 114, the flow channel 115a, the slot 116, and the venting hole 117. Hereinafter, an inner structure of the battery storing box 110 is described in detail.

Since configurations of the upper case 111 and the lower case 112 of the present embodiment are almost the same, description of the lower case 112 replaces description of the upper case 111.

Figure 5:
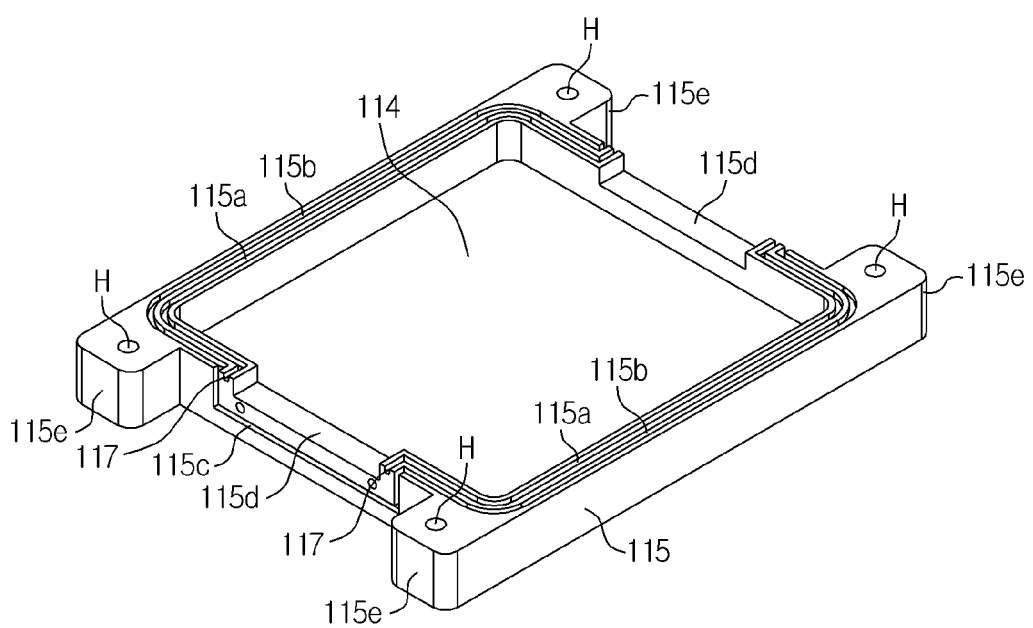

First, referring to FIG. 5, the lower case 112 includes a battery storing unit 114 and a case peripheral unit 115.

The battery storing unit 114 seats one or more secondary batteries B therein and forms the battery accommodation space. The secondary battery B may be arranged in the battery storing unit 114. Therefore, the battery storing unit 114 may be designed in a size corresponding to the width and the length of the secondary battery B.

Meanwhile, the battery storing unit 114 may include a metallic material such as aluminum having high heat conductivity. For example, a cell body of the secondary battery B may be arranged to directly contact the battery storing unit 114. Here, a heat dissipation effect of the secondary battery B may be increased by configuring the battery storing unit 114 with aluminum.

The case peripheral unit 115 configures a wall along a circumferential direction of the battery storing unit 114. In the present embodiment, the case peripheral unit 115 may be manufactured in a quadrangular frame form surrounding the battery storing unit 114.

The upper case 111 and the lower case 112 may be coupled such that upper surfaces of the case peripheral units 115 face each other. Here, the upper surface of the case peripheral unit 115 corresponds to the coupling surface of the battery storing box 110.

A step difference unit 115d lower than the upper surface is provided to the opposite lateral sides corresponding to a short side of the case peripheral unit 115. The electrode lead L of the secondary battery B may be put on the step difference unit 115d. Since the step difference unit 115d of the lower case 112 and the step difference unit 115d of the upper case 111 are symmetrically aligned with respect to the coupling surface, the slot 116 of the battery storing box 110 may be formed.

Also, the case peripheral unit 115 includes a first groove 115a. The first groove 115a is a part forming the flow channel of the battery storing box 110. Like the slot 116 of the battery storing box 110, the first groove 115a of the lower case 112 and the first groove 115a of the upper case 111 are symmetrically aligned with respect to the coupling surface to form the flow channel.

The first groove 115a may be collapsed by a preset depth from the upper surface of the case peripheral unit 115, and as illustrated in FIG. 5, may extend from one lateral side of the case peripheral unit 115 to the other lateral side along a long side of the case peripheral unit 115. In the present embodiment, the first groove 115a may be divided into two parts with respect to the step difference unit 115d and the divided two first grooves 115a may respectively pass through opposite long sides of the case peripheral unit 115. In this case, gases generated from the secondary battery B may be discharged to outside more effectively and swiftly than a case where one first groove 115a is provided.

Figure 6:
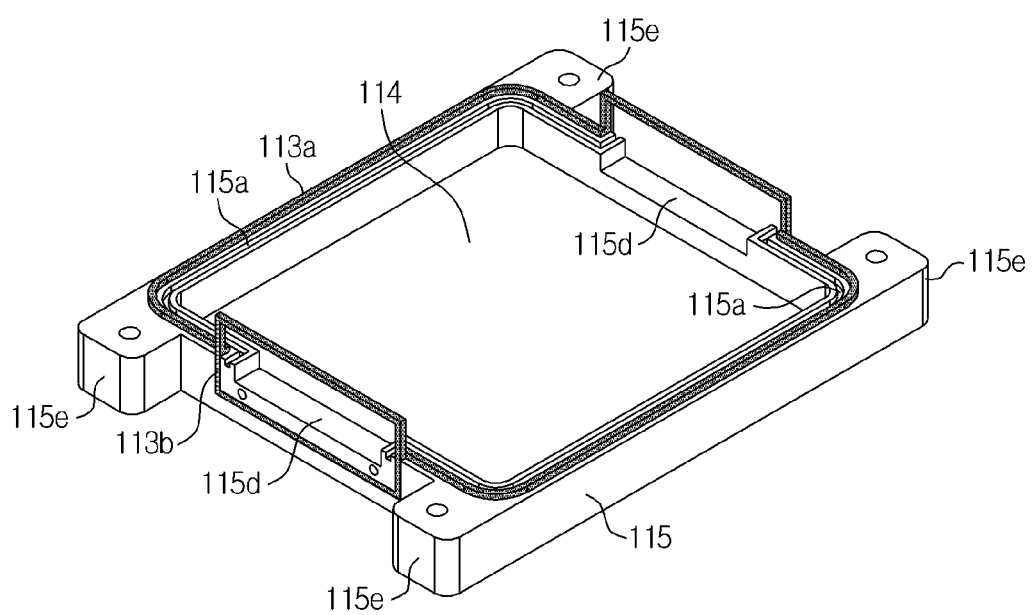

The case peripheral unit 115 may further include a second groove 115b and a third groove 115c. As illustrated in FIG. 5, similarly with the first groove 115a, the second groove 115b may be collapsed by a preset depth from the upper surface of the case peripheral unit 115 and may extend from one lateral side of the case peripheral unit 115 to the other lateral side along the long side of the case peripheral unit 115. Also, the second groove 115b may be formed to an outer side with respect to the first groove 115a. As illustrated in FIG. 6, a sealing member 113a may be provided to the second groove 115b.

According to this configuration, when the lower case 112 is coupled to the upper case 111, the sealing member 113a is provided to a space prepared by alignment of the second groove 115b of the lower case 112 and the second groove 115b of the upper case 111, and thus a sealing characteristic between the lower case 112 and the upper case 111 may be improved. Therefore, gas leakage between coupling surfaces of the lower case 112 and the upper case 111 may be prevented. Here, for the sealing member 113a, a gasket including a rubber material such as ethylene propylene diene monomer (EPDM) may be used.

Figure 4:
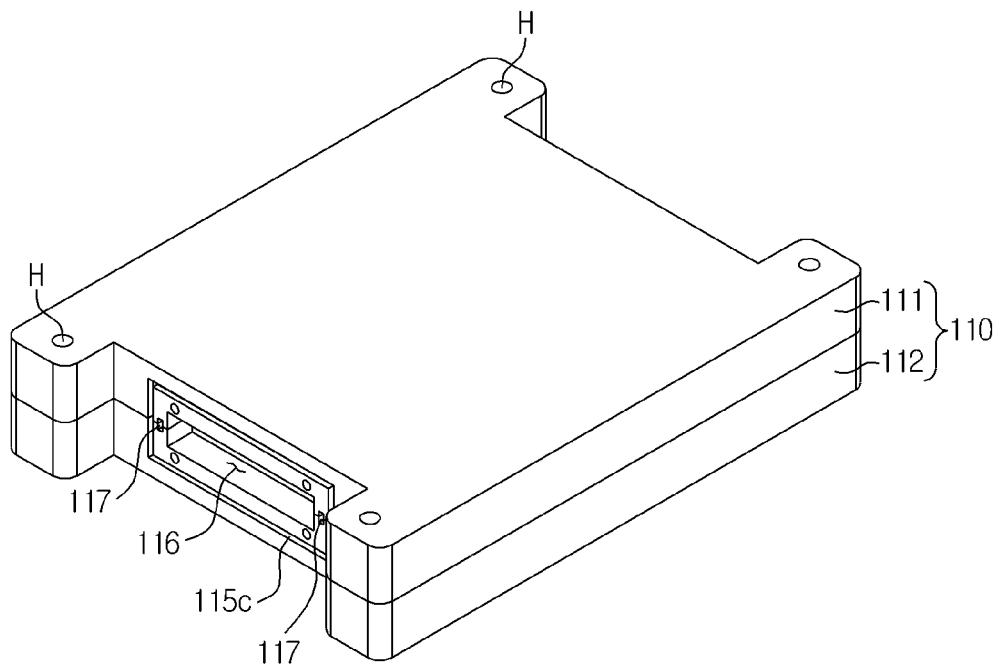
FIGS. 4 to 7 are perspective views illustrating components of the secondary battery cartridge of FIG. 2.

Referring to FIGS. 4 and 5, the third groove 115c may be collapsed by a preset depth from an outer wall surface of the opposite lateral surfaces of the case peripheral unit 115, connected to the second groove 115b, and formed in a form surrounding the step difference unit 115d and an outer side of a point at which the first groove 115a ends. Therefore, when the lower case 112 is coupled to the upper case 111, a quadrangular frame-shaped intaglio may be formed on the opposite lateral sides of the battery storing box 110 by the third groove 115c of the lower case 112 and the third groove 115c of the upper case 111.

Referring to FIG. 6, like the second groove 115b, a sealing member 113b may be further provided to the third groove 115c. Here, the sealing member 113b provided to the third groove 115c is a configuration for increasing adhesive force between the lateral sides of the battery storing box 110 and the cover unit 130. As described below, the sealing member 113b fit into the third groove 115c may stick to an open end of an inner cover 132 of the cover unit 130, and prevents gases flowing through the slot 116 and the venting hole 117 from leaking to outside.

For example, though separate sealing members may be respectively provided to the second groove 115b and the third groove 115c, the present embodiment implements a continuous sealing line and simplifies an assembly process by manufacturing the sealing member 113a fit into the second groove 115b and the sealing member 113b fit into the third groove 115c as one body.

Also, an assembly finger 115e protruding further than other parts and including a through hole H may be provided to a corner region of the case peripheral unit 115. A rod-type fastening member may be inserted into and may pass through the through hole H. For example, the upper case 111 may be coupled to the lower case 112 when the long bolt 140 is fit into the assembly finger 115e. Also, the plurality of cartridges 100 (see FIG. 10) may be connected and assembled as one body by using one long bolt 140.

Next, the sensing unit 120 is electrically connected to the electrode lead L of the secondary battery B, and connected to another secondary battery cartridge 100 or an external device by connection between the terminals 124. The sensing unit 120 may be mounted on at least one lateral side of the battery storing box 110. For example, a configuration of the sensing unit 120 may change according to a kind of the secondary battery depending on the location of the electrode lead L. For example, in the case of a secondary battery B having a one-direction electrode lead L, the sensing unit 120 may be mounted on only one lateral side of the battery storing box 110. In the case of a secondary battery B having a two-direction electrode lead L, like the present embodiment, the sensing units 120 may be respectively mounted on the opposite lateral sides of the battery storing box 110.

Figure 7:
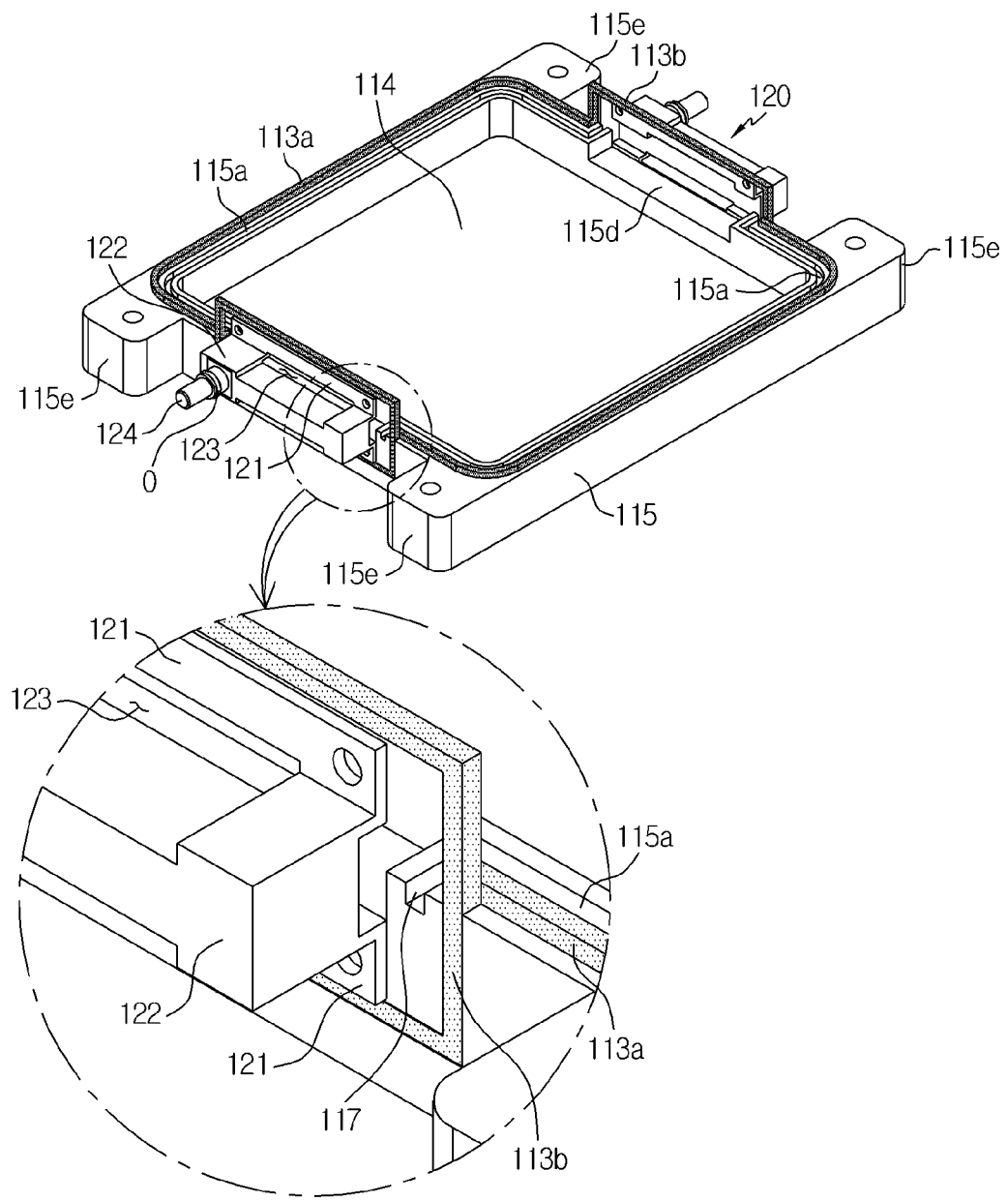

Specifically, referring to FIG. 7, the sensing unit 120 according to the present embodiment includes a pair of brackets 121 and a sensing block 122.

The pair of brackets 121 may be coupled to the lateral outer wall of the battery storing box 110 such that the brackets 121 are spaced apart from each other with the slot 116 therebetween. For example, the bracket 121 may be assembled, by using a bolt, to the lateral outer wall of the battery storing box 110.

The sensing block 122 is connected to the pair of brackets 121 such that the sensing block 122 is located in front of the slot 116. For example, as illustrated in FIG. 7, the sensing block 122 and the pair of brackets 121 may be formed as one body. The sensing block 122 protrudes from the bracket 121 and has a width of a central part thereof narrower than the widths of opposite ends thereof such that two lead-passing holes 123 are provided between the central part thereof and the pair of brackets 121.

The electrode lead L of the secondary battery B may pass through the lead-passing hole 123, and the electrode lead L of the secondary battery B that has passed through the lead-passing hole 123 may be fixed to a body of the sensing block 122 by using welding, etc. Also, the terminal 124 may be further coupled to the sensing block 122.

The terminal 124 may pass through the cover unit 130 and be exposed to outside. Here, an O-ring may be further fit to the periphery of the terminal 124 in order to prevent gas leakage between the terminal 124 and a through hole of the cover unit 130.

Next, the cover unit 130 shields the slot 116 and the venting hole 117 of the battery storing box 110 and protects the sensing unit 120. Referring to FIG. 2, the cover unit 130 may be mounted on the opposite lateral sides of the battery storing box 110 to cover the slot 116, the venting hole 117, and the sensing unit 120.

Figure 8:
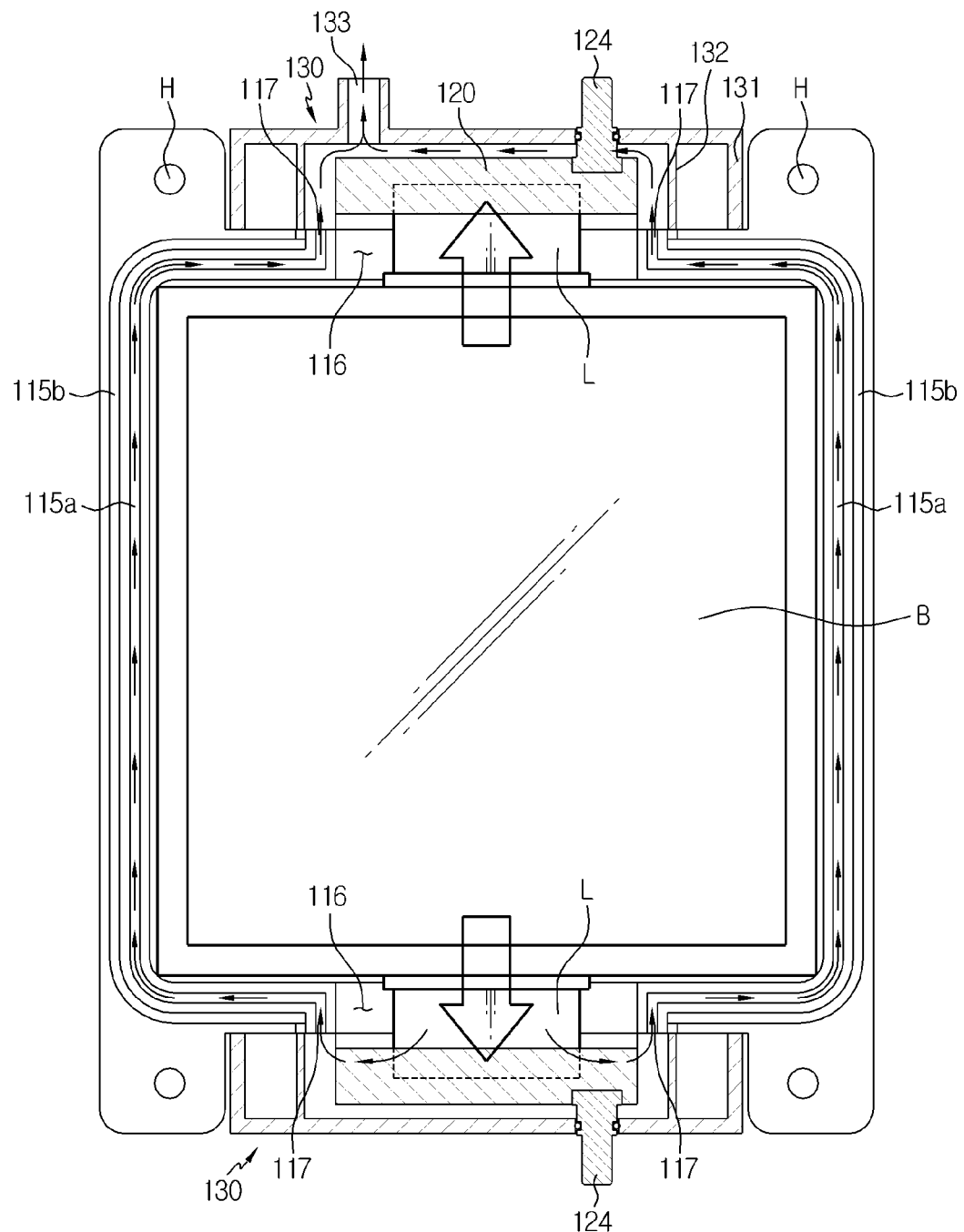
FIG. 8 is a cross-sectional view of the secondary battery cartridge of FIG. 2.

In the present embodiment, referring to FIGS. 3 and 8, the cover unit 130 includes the inner cover 132 and an outer cover 131. The cover unit 130 may have a double structure. The outer cover 131 is provided to be suitable for a width between the assembly fingers 115e of the battery storing box 110, and the inner cover 132 is provided to have the open end corresponding to the quadrangular frame intaglio-shaped third groove 115c. As described above, the sealing member 113b is provided between the open end of the inner cover 132 and the third groove 115c. The inner cover 132 shields the slot 116 and the venting hole 117. A gas leakage prevention effect may be raised even more and self mechanical rigidity may be increased by configuring the cover unit 130 with the double structure.

Meanwhile, the cover units 130 are mounted, one by one, on the opposite lateral sides of the battery storing box 110, and the gas outlet 133 is provided to at least one of the cover units 130. Although the gas outlets 133 may be provided to both two cover units 130, it is preferable that the gas outlet 133 is provided to one of the cover units 130 in order to unify a gas discharge path. The gas outlet 133 may communicate with the inner cover 132. Therefore, in the secondary battery cartridge 100 according to the present embodiment, gases are discharged to outside through only the gas outlet 133.

Hereinafter, the gas discharge path of the secondary battery cartridge 100 according to the present embodiment is described with reference to FIGS. 8 and 9.

In the pouch type secondary battery B, since heat emission is severe and a sealing characteristic is weak, particularly, in a part where the electrode lead L is attached, gas leakage may easily occur at a portion where the electrode lead L is provided. When gases leak from the inside of the secondary battery B through the part of the electrode lead L, the gases are introduced to the inner cover 132 through the slot 132.

Figure 9:
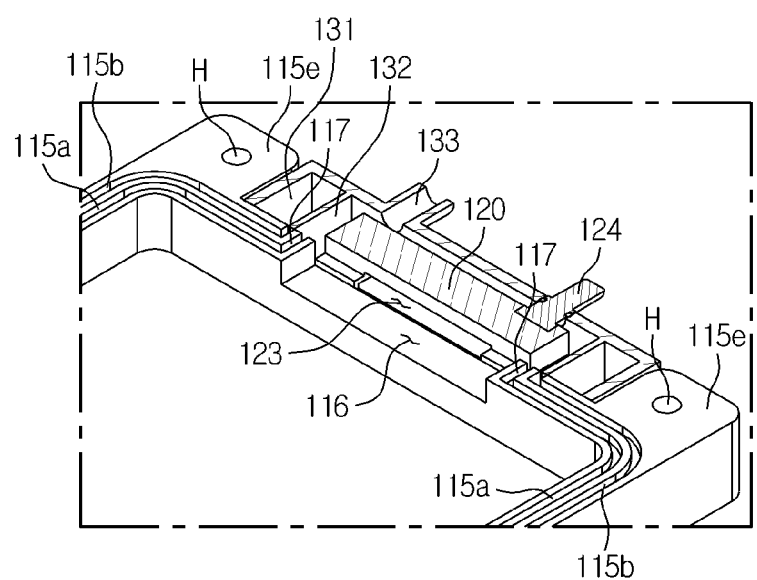
FIG. 9 is an enlarged view of a primary part of FIG. 8.

Referring to FIGS. 8 and 9, the gases introduced to the inner cover 132 to which the gas outlet 133 is provided may be discharged to outside through the gas outlet 133. Gases introduced to the inner cover 132 on the opposite side to which the gas outlet 133 is not provided may be likewise introduced to the inside of the inner cover 132 through the slot 116, and then may be sucked into the opposite venting hole 117 adjacent to the slot 116. For reference, when gases are generated, since inner pressure of the battery storing box 110 is higher than external pressure, flow of the gases may be directed toward the gas outlet 133 due to a pressure difference.

Next, the gases may come out of the opposite venting hole 117 by way of the flow channel formed in the case peripheral unit 115 of the battery storing box 110, and may be discharged to the outside of the secondary battery cartridge 100 through the gas outlet 133.

The secondary battery cartridge 100 having the above configuration according to the present disclosure may not only serve as a stacking guide of the secondary battery B but also discharge gases generated when the secondary battery B malfunctions on a cartridge basis to a specific path. Therefore, when the secondary battery cartridge 100 is utilized, a pack case (for example, the pack case illustrated in FIG. 1) among components of the battery module 10 or the battery pack may be omitted.

Figure 10:
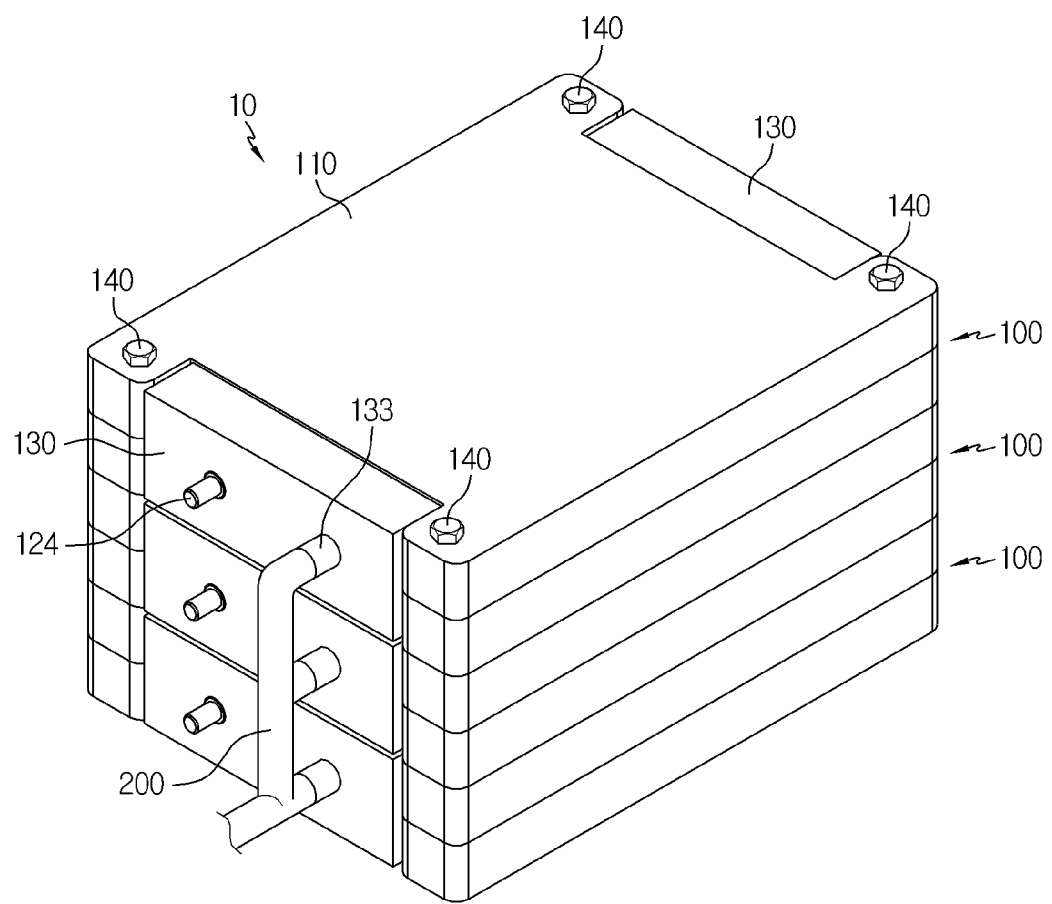
FIG. 10 is a perspective view schematically illustrating a configuration of a battery module according to an embodiment of the present disclosure.

FIG. 10 is a perspective view schematically illustrating a configuration of a battery module 10 according to an embodiment of the present disclosure.

The battery module 10 according to the present embodiment may be configured by stacking a plurality of secondary battery cartridges 100. For example, as illustrated in FIG. 10, the secondary battery cartridges 100 may be stacked in a layer arrangement such that the gas outlets 133 face the same direction. The stacked bodies of the secondary battery cartridges 100 may be assembled as one body by using the long bolt 140. Here, the long bolt 140 may be inserted into the through hole H of the assembly finger 115e provided to the corner region of each secondary battery cartridge 100.

Also, the terminals 124 may be connected by using a bus bar or a cable (not shown), etc. That is, the secondary batteries B stored in respective cartridges 100 may be electrically connected by connection of the terminals 124.

Meanwhile, a manifold 200 may be coupled to the gas outlets 133 of the respective cartridges 100. The manifold 200 collects gases discharged from the inside of the respective cartridges 100 to one place. The manifold 200 may be connected to an exhaust line (not shown).

According to the battery module 10 according to the present embodiment, the respective cartridges 100 have a sealed structure and a flow channel which may discharge gases is designed therein. Therefore, an external case which was required for discharging gases in a related art may be omitted.

The battery pack according to the present disclosure may include one or more battery modules according to the present disclosure. Also, the battery pack according to the present disclosure may further include various apparatuses for controlling charging/discharging of the battery module, for example, a battery management system (BMS), a current sensor, a fuse, etc. in addition to the battery module.

The battery module according to the present disclosure is applicable to an automobile such as an electric automobile or a hybrid automobile. That is, an automobile according to the present disclosure may include one or more battery modules according to the present disclosure.

Although the present application has been described through limited embodiments and drawings, the present application is not limited thereto and it is obvious that various changes and modifications may be made by those skilled in the art within the technical spirit of the present disclosure and equivalent scope of appended claims.

Meanwhile, in the case where terms representing directions such as up, down, left, right, front, and rear are used in the present specification, it is obvious to those skilled in the art that these terms are used for convenience of description only, and the terms may change depending on a location of an object considered as a subject or a location of an observer, etc.

INDUSTRIAL APPLICABILITY

The present disclosure relates to a secondary battery cartridge, and particularly, is applicable to a battery module including the secondary battery cartridge, and a device driven by the battery module, for example, an electric automobile related industry.

What is claimed is:

1. A secondary battery cartridge comprising:
   a battery storing box comprising:
      a battery accommodation space in which a secondary battery is stored;
      a flow channel partitioned from the battery accommodation space in the battery storing box, and having a hollow structure;
      a pair of slots communicating with the battery accommodation space and provided at opposite side parts of the battery storing box; and
      a pair of venting holes communicating with the flow channel and provided at the opposite side parts of the battery storing box;
   a sensing unit comprising an electrically conductive material, mounted on at least one side part of the opposite side parts of the battery storing box, and electrically connected to an electrode lead of the secondary battery, the electrode lead extending to an inside and an outside of the battery storing box through the corresponding slot of the at least one side part; and
   a pair of cover units provided in a box form having one open side, and mounted on the opposite side parts of the battery storing box in order to shield the pair of slots, the pair of venting holes, and the sensing unit of the battery storing box,
   wherein a gas outlet is provided in at least one of the cover units of the pair of cover units.

2. The secondary battery cartridge of claim 1, wherein the battery storing box comprises an upper case and a lower case, and the battery accommodation space, the flow channel, the slot, and the venting hole are formed by mutual coupling of the upper case and the lower case.

3. The secondary battery cartridge of claim 2, wherein each of the upper case and the lower case comprises:
   a battery storing unit configured to form a space in which the secondary battery is arranged; and
   a case peripheral unit configured to form a wall along a peripheral direction of the battery storing unit, the upper case and the lower case being coupled such that upper surfaces of the case peripheral units face each other.

4. The secondary battery cartridge of claim 3, wherein the case peripheral unit comprises a first groove collapsed by a preset depth from an upper surface thereof and configured to form the flow channel, the first groove extending to the venting hole.

5. The secondary battery cartridge of claim 4, wherein the case peripheral unit further comprises a second groove collapsed by a preset depth from the upper surface thereof at a location partitioned from the first groove, the battery storing box further comprising a sealing member provided to the second groove.

6. The secondary battery cartridge of claim 3, wherein the case peripheral unit further comprises a step difference unit lower than an upper surface thereof at locations corresponding to the opposite side parts, the step difference unit forming a part of the slot.

7. The secondary battery cartridge of claim 3, wherein an assembly finger protruding further than other parts and comprising a through hole is provided to a corner region of the case peripheral unit.

8. The secondary battery cartridge of claim 7, wherein a rod-type fastening member is inserted into and passes through the through hole of the assembly finger.

9. The secondary battery cartridge of claim 1, wherein the sensing unit comprises:
   a pair of brackets coupled to a lateral outer wall of the battery storing box such that the pair of brackets are spaced apart from each other at a preset interval with the slot therebetween; and
   a sensing block connected to the pair of brackets such that the sensing block is located in front of the slot, comprising a lead-passing hole through which an electrode lead of the secondary battery passes, and contacting the electrode lead.

10. The secondary battery cartridge of claim 9, wherein the lead-passing hole is provided as at least two lead-passing holes.

11. The secondary battery cartridge of claim 9, wherein the secondary battery cartridge further comprises a terminal passing through the cover unit and connected to the sensing block.

12. The secondary battery cartridge of claim 11, wherein an O-ring is provided to a terminal through-hole of the cover unit through which the terminal passes.

13. The secondary battery cartridge of claim 5, wherein the battery storing box further comprises a third groove collapsed by a preset depth from opposite lateral outer walls of the battery storing box, connected to the second groove, and surrounding the slot and the venting hole, and
   the cover unit comprises an inner cover having an open end corresponding to the third groove and configured to shield the slot and the venting hole, and an outer cover configured to shield the inner cover, the sealing member being further provided between the third groove and the open end of the inner cover.

14. A battery module comprising the secondary battery cartridge of claim 1.

15. An automobile comprising the battery module of claim 14.

16. The secondary battery cartridge of claim 2, wherein the upper case and the lower case are mirror images of each other.

* * * * *